United States Patent [19]

Pechuk et al.

[11] 3,757,573
[45] Sept. 11, 1973

[54] LOAD CELL WITH RESISTANCE STRAIN GAUGES

[76] Inventors: Vasily Ivanovich Pechuk, ulitsa Umanskaya, 49, kv. 8; Vladimir Mikhailovich Pompeev, ulitsa Dorogoznitskaya, 13, kv. 28; Galina Petrovna Taratukhina, ulitsa Chapaeva, 8, kv. 13, all of Kiev, U.S.S.R.

[22] Filed: Jan. 25, 1972

[21] Appl. No.: 220,640

Related U.S. Application Data

[63] Continuation of Ser. No. 875,119, Nov. 10, 1969.

[52] U.S. Cl................................................ 73/141 A
[51] Int. Cl. ............................................... G01l 1/22
[58] Field of Search .................... 73/141 A, 398 AR, 73/420

[56] References Cited
UNITED STATES PATENTS

| | | | |
|---|---|---|---|
| 2,864,972 | 12/1958 | Li | 73/398 AR X |
| 2,969,514 | 1/1961 | Curtis | 73/398 AR X |
| 3,060,396 | 10/1962 | Gibbs et al. | 73/398 AR X |
| 3,269,187 | 8/1966 | Perino | 73/398 AR |
| 3,320,802 | 5/1967 | Birkholtz | 73/141 A |

FOREIGN PATENTS OR APPLICATIONS

| | | | |
|---|---|---|---|
| 209,813 | 3/1968 | U.S.S.R. | 73/141 A |

*Primary Examiner*—Charles A. Ruehl
*Attorney*—Waters, Roditi & Schwartz

[57] ABSTRACT

A load cell with resistance strain gauges comprising a solid insertion piece placed between an internal projection of the cell housing and a resilient element, the thickness of said insertion piece being selected depending upon the thickness of the resilient element so as to make a constant value with it. The latter fact provides a means for maintaining the mounting size of the cell constant when loads being measured are changed within a wide range.

3 Claims, 1 Drawing Figure

Patented Sept. 11, 1973 3,757,573
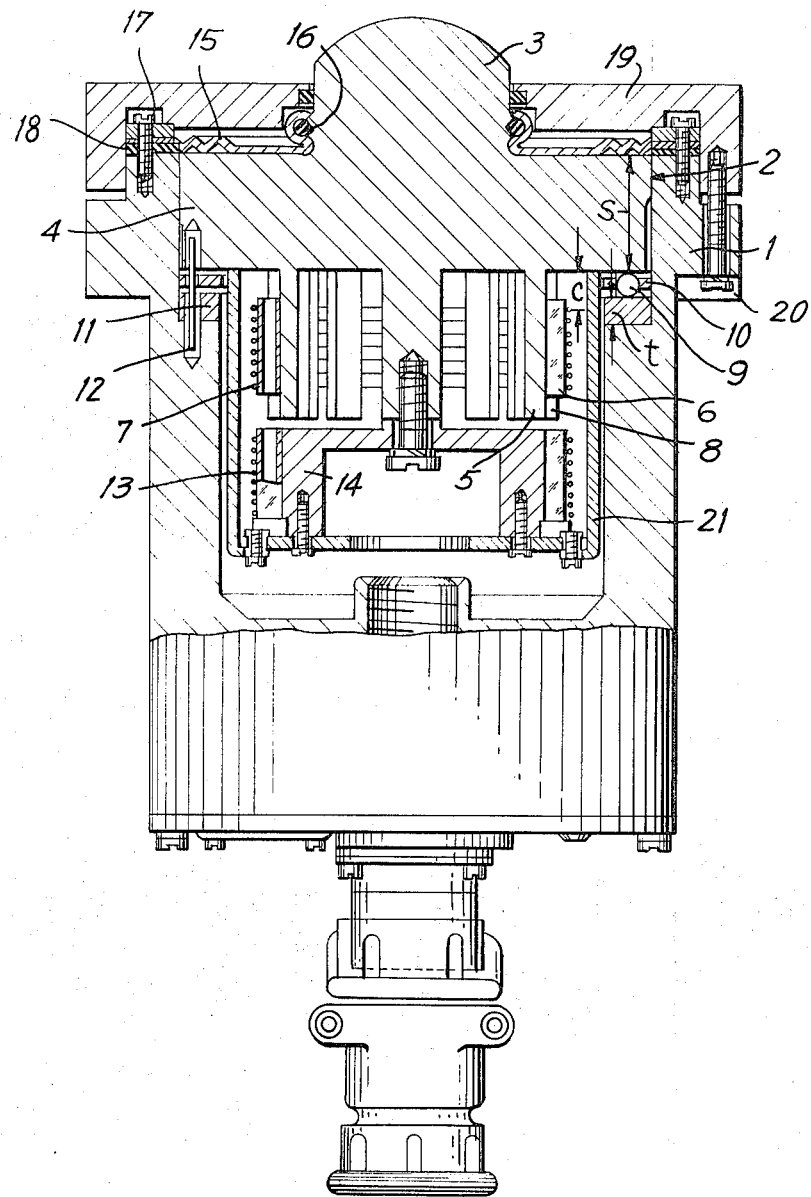

LOAD CELL WITH RESISTANCE STRAIN GAUGES

This is a continuation of application, Ser. No. 875,119, filed Nov. 10, 1969.

The present invention relates to devices which convert forces or other quantities proportional to forces, such as weight, mass, volume, level and so on, into proportional electric signals allowing remote control of these quantities, and more particularly the present invention is concerned with load cells with resistance strain gauges used in various fields of engineering.

There exist load cells with resistance strain gauges comprising a housing and a resilient element with resistance strain gauges attached to the resilient element.

A disadvantage of these load cells with resistance strain gauges is that the load cells intended for different ranges of the quantity being measured differ from each other in the size and shape of the parts and units, including the housing and the resilient element.

Therefore, when replacing load cells at a running outfit, for example in case the power of the outfit being controlled has changed, there arises a necessity to change the size of the mounting receptacle which is a costly operation.

Besides, to manufacture load cells in which the same parts have different size and shape, either a great variety of special rigs or universal equipment is required, both being unproductive and economically unreasonable.

Measurement characteristics of the load cell depend to a great extent upon the quality and condition of the housing surface at the places upon which the resilient element rests.

When the resilient element is deformed under the action of loads being measured, a relative displacement of the bearing surfaces takes place and friction develops at these places. Depending upon the amount of friction the load cell readings are coincident or different at the direct and reverse measurement courses (hysteresis). In order to sufficiently reduce measurement errors, the load cell housing should be made from special expensive materials which are friction, wear and deformation-resistant.

Besides, insofar as the load cell housing is complex-shaped, thermal treatment of the housing surface presents a problem.

The hardness of the housing which should be sufficiently high at places where the resilient element rests upon the housing, is undesirable in other places of the housing, since it reduces resistance to impacts.

An object of the present invention is to provide a load cell with resistance strain gauges free from these disadvantages.

The present invention has for its objective the provision of a load cell with resistance strain gauges, the mounting size and measurement characteristics of which are independent of, and the size of the parts and units making up the load cell is dependent but insignificantly upon the range of the quantity being measured for which the load cell is intended.

This objective is attained in a load cell with resistance strain gauges, having a housing which accomodates compensating resistors and a resilient element resting upon an internal projection of the housing, wherein placed between the internal projection of the housing and resilient element is, according to the present invention, an insertion piece whose thickness is selected depending upon the thickness of the resilient element so that the sum of the thickness has a constant value.

The insertion piece is preferably made from a material featuring an increased hardness (not less than 40 HRC), sufficient resistance to wear and minimum coefficient of friction.

The thickness of the resilient element and, hence, of the insertion piece depends, with the given load being measured, upon the position of the resistance strain gauges on the props of the resilient element and upon the mechanical characteristics of the resilient element material.

Therefore, to avoid changing the sizes of the resilient element and insertion piece when using materials with differing mechanical characteristics, which difference is due to permissible spread to the chemical composition and other parameters of the given material, the resistance strain guages are preferably mounted on props provided with grooves which allows the strain gauges to be adjusted along the props.

By thus adjusting the resistance strain gauges along the props, it is possible to vary the nominal loads for which the load cell is intended within some definite range without changing the sizes of the resilient element and insertion piece.

The invention will be better understood from the following description of an embodiment given by way of example with due reference to the accompanying drawing which shows a cross sectional view of a load cell with resistance strain gauges, according to the invention.

The load cell has a housing 1 which accomodates a resilient element 2 in the form of a solid body of rotation with a hemispherical projection 3 responsive to loads being measured and a base fashioned as a flat disc 4 fitted with props 5 located in a circular position and carrying glass-tube insulators 6 with resistance strain gauges 7.

The props 5 are provided with axially extending external grooves 8 which permit the insulators 6 with the resistance strain gauges 7 to be adjusted along the props 5 when assembling the load cells, so that with a preset load a required deformation of the strain gauges is provided.

The resilient element 2 rests with its bearing surface upon concentrically disposed balls 9 enclosed in a sleeve 10 which, in turn, rests upon a ring-shaped insertion piece 11 made, for example, of steel featuring increased hardness (not less than 40 HRC). A detainer made, for example, as a joint pin 12 serves for fixing the relative positions of the resilient element 2, sleeve 10 with the ball 9, insertion piece 11 and housing 1.

Heat-compensating resistors 13 are mounted on a separate frame 14 not subject to deformation under the action of the load being measured.

A thin diaphragm 15 rolled on the neck portion of the resilient element 2 with an elastic sealing packing 16 makes the load cell hermetically sealed on the side of the resilient element. The diaphragm is pressed to the housing 1 by means of screws 17 through a washer 18.

A cover 19 protects the thin diaphragm 15 from mechanical damages.

The load cell is placed in a mounting receptacle provided for the purpose. The load cell in the mounted position rests with its external flange 20 upon a shoulder in the receptacle.

To protect the resistance strain gauges and the heat-compensating resistors from injuries during operation of the cell, there is provided a protective shell 21 which simultaneously serves as a heat screen.

The device operates as follows.

When a load being measured is applied to the projection 3, the resilient element deflects, thereby causing the props 5 to move apart and, hence, the resistance strain gauges 7 to extend.

The resistance strain gauges 7 and the heat-compensating resistors 13 are connected in a bridge circuit the output voltage of which is directly proportional to the load being measured at the given supply voltage.

The present invention is advantageous in that it provides for maximum unification of the parts and units of the cell, wide range of loads being measured, and unified input and output electrical parameters. The load cells have identical size and shape of the housing.

The insertion piece 11, whose thickness makes a constant value with the thickness of the resilient element 2, allows the internal projection in the cell housing to be made at one and the same level and of the same size irrespective of the nominal load for which the cell is intended.

The insertion piece can be of simple configuration, such as a ring, readily subject to heat treatment and making it possible to machine its bearing surface to the required finish.

The balls placed between the resilient element and the insertion piece which is very hard, wear-resistant and has a minimum coefficient of friction, strictly and precisely fix the points of rest of the resilient element, turn sliding friction into rolling friction without forming dents on the hard surface of the insertion piece.

The grooves provided in the props of the resilient element make it possible to change the position of the resistance strain gauges relative to the base of the resilient element.

All the foregoing makes it possible to provide load cells intended for various nominal loads within a certain definite range without changing the sizes of the load cell parts.

Changeover from one range of nominal loads to another involves replacing only two parts of the cell, the resilient element and insertion piece, the sizes of the other parts remaining unchanged.

What is claimed is:

1. A load cell with resistance strain gauges comprising a housing, a resilient element responsive to a load being measured, said resilient element being accomodated within said housing and resting upon an internal projection of said housing, props of said resilient element, resistance strain gauges mounted on said props, an insertion piece placed between said internal projection of said housing and said resilient element, the thickness of said insertion piece being selected depending upon the thickness of the resilient element whereby the sum of said thicknesses has a constant value.

2. An apparatus as claimed in claim 1, in which said insertion piece is made of a material whose hardness is not less than 40 HRC, as of tempered steel.

3. An apparatus as claimed in claim 1, in which said props of the resilient element, intended for mounting said resistance strain gauges, are provided with axially extending grooves allowing said resistance strain gauges to be axially adjusted along said props.

* * * * *